Oct. 11, 1938.  A. B. SMEAL ET AL  2,132,444
AMUSEMENT DEVICE IN WHICH WEIGHTS ARE PROJECTED UPWARDLY
Filed Feb. 12, 1936  6 Sheets-Sheet 1
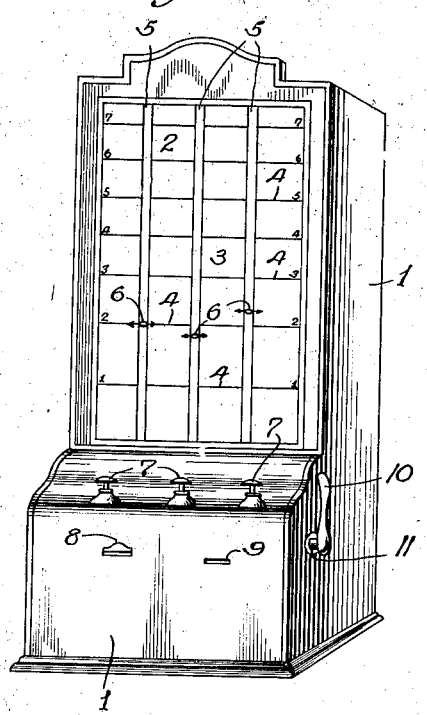
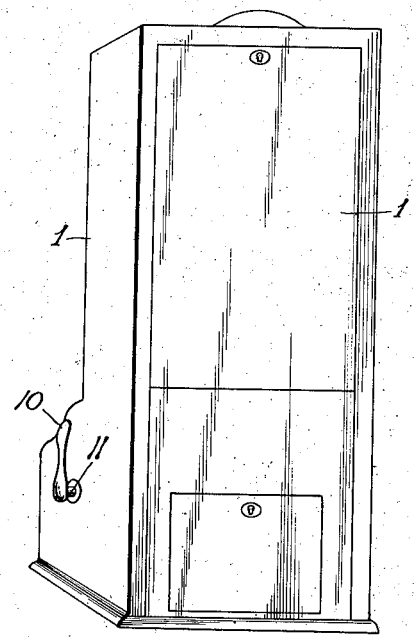
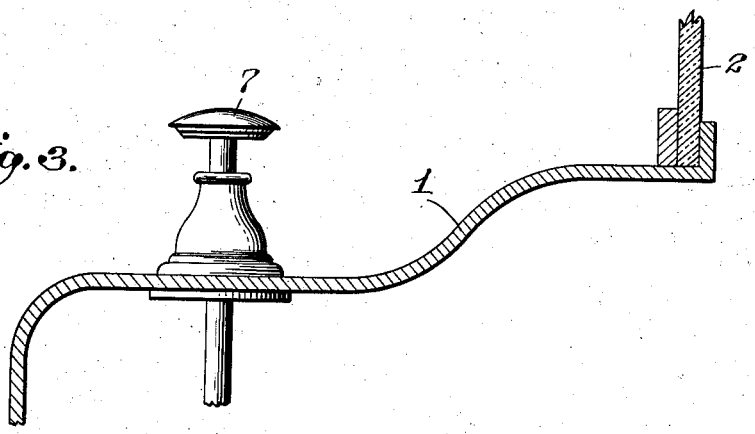
Inventors:
Arthur B. Smeal
Walter K. Jutt
By: Richardson & Auer
Attys.

Oct. 11, 1938.   A. B. SMEAL ET AL   2,132,444
AMUSEMENT DEVICE IN WHICH WEIGHTS ARE PROJECTED UPWARDLY
Filed Feb. 12, 1936   6 Sheets-Sheet 4

Inventors:
Arthur B. Smeal
Walter K. Jull
By: Richardson and Quer
Attys.

Oct. 11, 1938.    A. B. SMEAL ET AL    2,132,444
AMUSEMENT DEVICE IN WHICH WEIGHTS ARE PROJECTED UPWARDLY
Filed Feb. 12, 1936    6 Sheets-Sheet 5
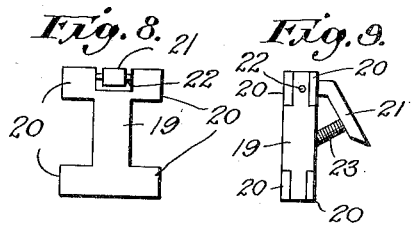
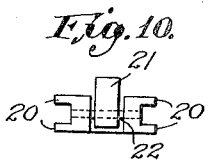
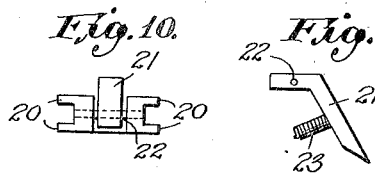
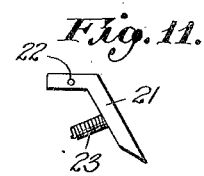
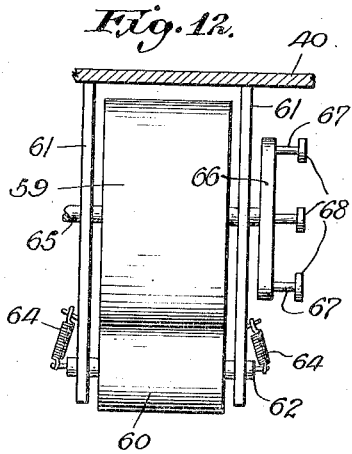
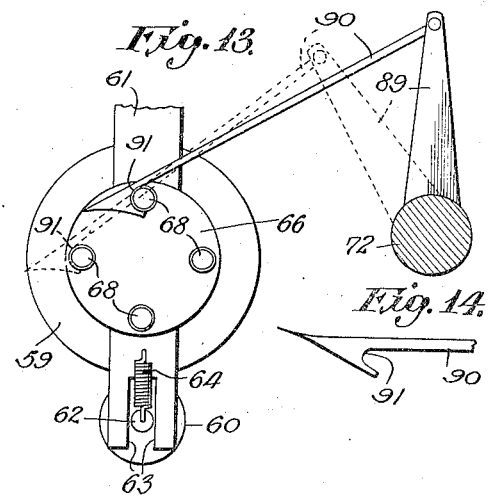
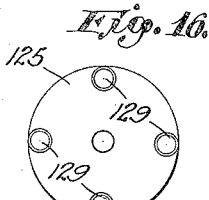
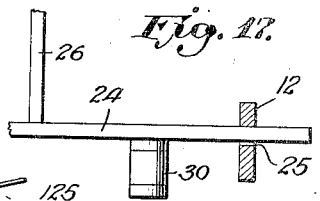
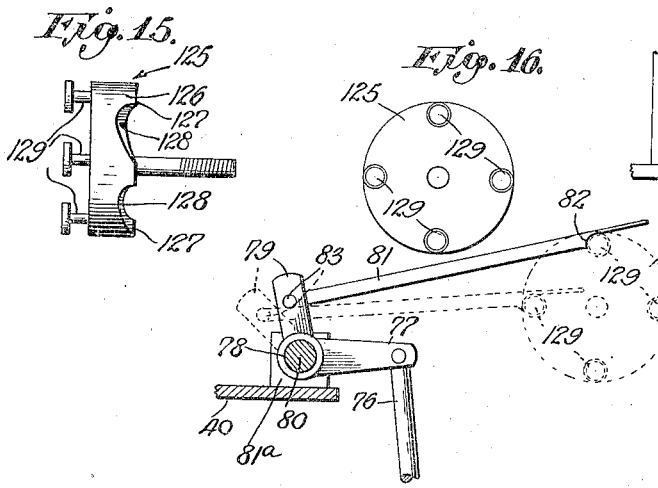
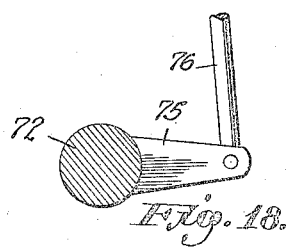
Inventors:
Arthur B. Smeal
Walter K. Jutt
By: Richardson and Auer
Attys Oct. 11, 1938. A. B. SMEAL ET AL 2,132,444
AMUSEMENT DEVICE IN WHICH WEIGHTS ARE PROJECTED UPWARDLY
Filed Feb. 12, 1936  6 Sheets-Sheet 6
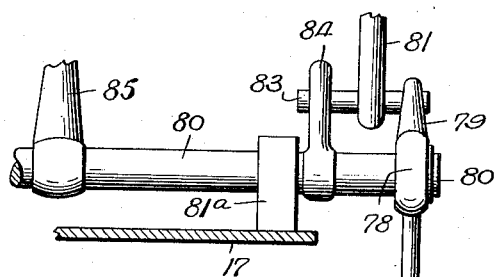
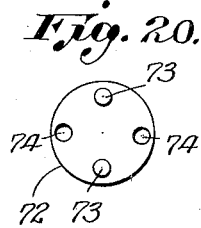
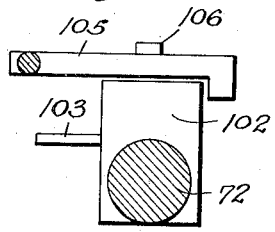 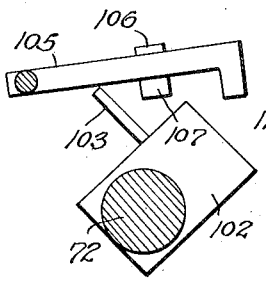 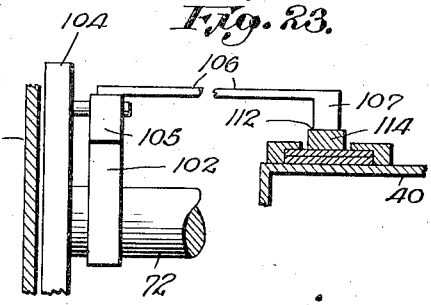
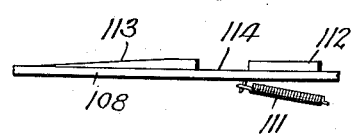 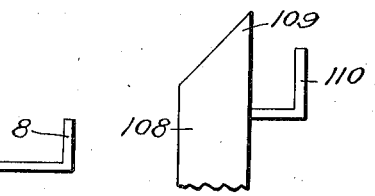
Inventors:
Arthur B. Smeal
Walter K. Jull
By: Richardson and Quer
Attys Patented Oct. 11, 1938

2,132,444

UNITED STATES PATENT OFFICE 2,132,444

AMUSEMENT DEVICE IN WHICH WEIGHTS ARE PROJECTED UPWARDLY

Arthur Bulmer Smeal and Walter Kingsley Juil, Calgary, Alberta, Canada

Application February 12, 1936, Serial No. 63,662
In Canada September 16, 1935

18 Claims. (Cl. 273—108)

Our invention relates to an amusement device which is normally locked and is released for operation by the insertion of a coin or token or the like, and is more particularly concerned with a device of this character wherein a plurality of weights are successively projected upwardly along guide slots provided in a suitable channel, together with mechanisms for catching and locking a projected weight in suspended position, and means for indicating to the player his skill in positioning a plurality of such weights successively with relation to each other.

Devices of this general class are known. Our invention includes improvements and several novel features which enhance the utility and operation of the device. The following brief description is furnished in order to note the co-operation of principles and detail parts in the new combination of our structure.

Our device comprises a housing or casing having a lower operating portion and an upper indicating portion. The operating portion is provided with a number of actuating plungers, a coin slot, an opening through which a printed record of the performance of a player is furnished at the termination of every play, and an operating lever to be actuated at the conclusion of each play. The upper indicating portion, or display portion, of the device comprises a glass enclosure in front of a suitably decorated panel divided into a plurality of horizontal levels intersected by a plurality of vertical slots. Within each slot is provided a suitably shaped marker attached to the previousy noted weight. There are as many such weights and markers, each vertically movable within its corresponding slot, as there are actuating plungers. The plungers are provided with suitable knobs and, whenever one of these knobs is depressed, the corresponding weight and marker is propelled or projected upwardly in proportion to the force expended for actuating the plunger. The weight and its marker thus soar upwardly from the lowermost normal position until a point is reached where the propelling force ceases. The weight then begins to drop and is caught by a locking mechanism near the highest point attained by its upward motion, and is suspended thereat. The marker at this moment indicates on the display or indicating panel the position of the weight. Each of the several weights may thus be successively positioned by operating the corresponding plunger, and the markers will directly indicate to the player the relative positions attained.

The novel feature incorporated in the mechanism so far described consists in the provision of a combination of movable and stationary locking means behind each movable weight whereby the weights are suspended in their terminal positions at the end of their upward motion. These locking means are provided on bars forming in one embodiment a ratchet-like structure, one such bar being disposed behind each weight or play column and following the guide slot for each corresponding weight, and each comprising one or both types of ratchet-like stops, one type being pivoted and the other stationary.

If a weight is projected near to and above a stationary stop on the corresponding ratchet bar, it will fall upon it and will be suspended on it. However, if the weight is projected near to and above a pivoted stop on the corresponding ratchet bar, it will fall upon this pivoted stop and will be suspended by it, and in engaging this stop it will actuate it so as to initiate the selective setting of a recording printing mechanism in such a manner as to pre-select a character or sign to be subsequently printed on a record, denoting the position of the projected weight and marker. The record will be automatically furnished to the player at the conclusion of each play upon actuation of the previously noted operating lever.

After all plungers have been depressed by a player, he will note the relative positions of the markers (weights) against the indicating or display panel. He will then actuate the operating lever so as to return the mechanism to normal locked position, and the printed record of his score will be automatically furnished by the machine.

Upon insertion of another coin or token or the like the device may be released again for another play. The player may thus test his judgment and skill by actuating a plurality of like mechanisms propelling the weights and associated markers and suspending them at nearly like recording heights or levels on the display indicating panel.

Aside from the improvements noted above with reference to the movable and stationary stops provided singly or in combination in each play column and determining the locking of the weights in suspended position, we have provided numerous other novel objects and features, some of which may be concisely stated as follows:

One object relates to the provision of a device of the class described, comprising, a plurality of weights, means for projecting each weight upwardly along and within guide columns, stationary and movable stop means arranged vertically along and adjacent each guide column for catching said weights when projected upwardly, and means for laterally moving all of said stop means at the conclusion of a play for automatically releasing said weights.

Another object is concerned with the provision of means in a device, as defined in the previous paragraph, for separately recording the positions of weights suspended on the movable stops.

A further object refers to the provision of a device of the class described, together with a selectively operable recording mechanism wherein any of said movable stops causes the operation thereof incident to being engaged by a weight projected within the corresponding play column.

Still another object is covered by the provision of an amusement device of the previously defined class, wherein a cam means is actuated upon the conclusion of each play for the purpose of causing said vertically disposed stops to move sideways so as to release said suspended weights to normal.

These and other objects and features of our invention will appear as the detailed description progresses, which is rendered below with reference to the drawings. In these drawings, Fig. 1 is a somewhat diagrammatic front perspective view of our new device;

Fig. 2 is a diagrammatic rear perspective view of the device;

Fig. 3 is a partial sectional view of the device showing one of the actuating plungers and the relation thereof to the casing of the device;

Figure 4:
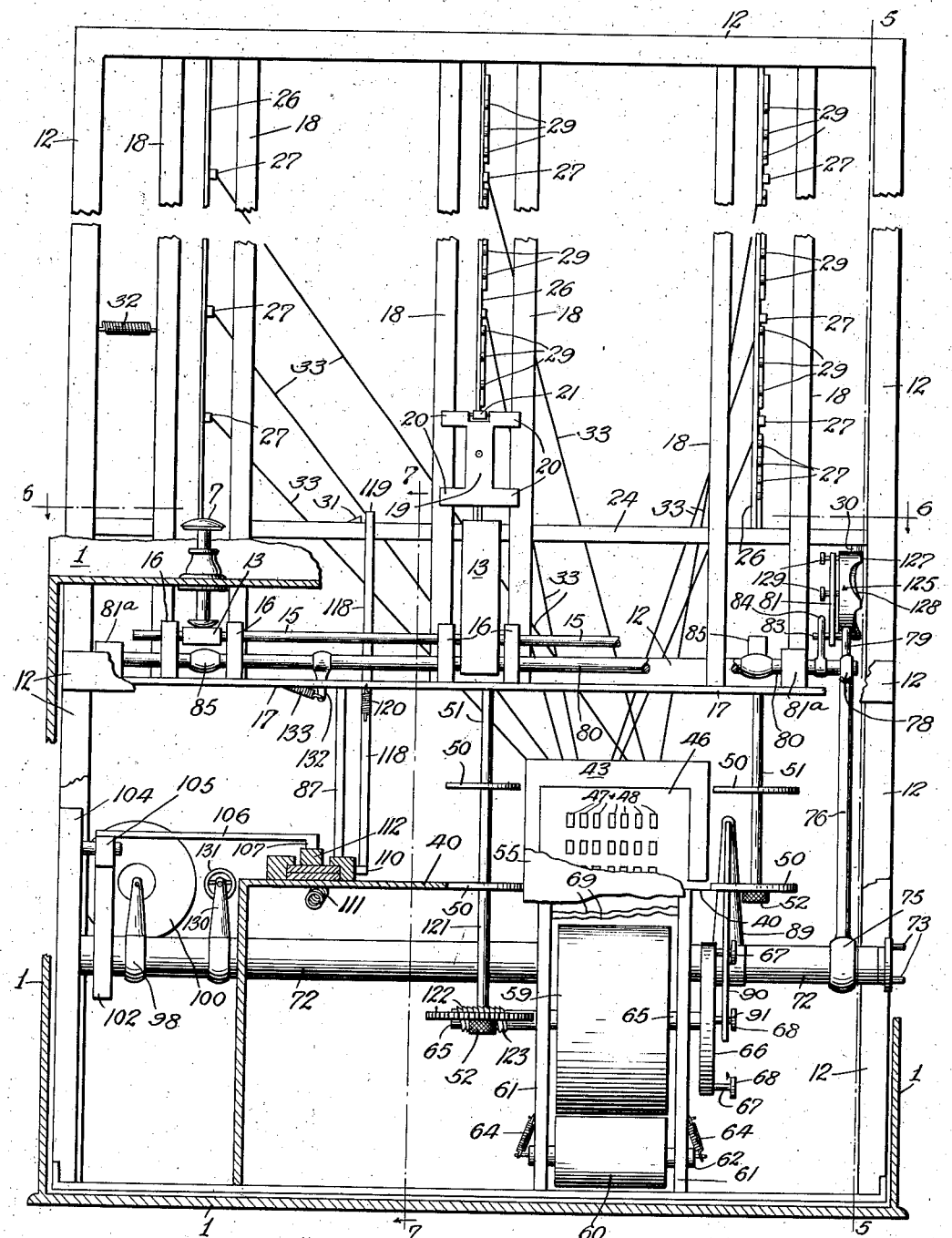
Fig. 4 is a front view of the device with parts cut away and showing the inside of the mechanism.

Figs. 8, 9, 10, and 11 show one of the weights, in front elevation, side elevation, plan view, and a detail of the catch arrangement on the weight, respectively;

Figs. 12, 13, and 14 illustrate the mechanism for operating the friction rollers for the recording paper, being a front elevation, a side elevation showing the main shaft, a fixed arm and a catch arm, and a detail of the catch arm, respectively;

Figs. 15, 16, 17, and 18 show details of the mechanism for moving the frame carrying the teeth or stops for catching and suspending the weights, being a detailed side elevation of an actuating cam, the front elevation of the cam, a detail of a part of the frame showing a stud which engages the cam, and showing a side elevation of a connection from the main shaft connecting with an auxiliary or upper shaft and catch arm for rotating the cam, respectively;

Figs. 19 and 20 show a detailed drawing of the lower portion of the operating lever journalled in the casing with several connecting elements, and an elevation of the end of the main shaft or the end of the bearing in the casing, respectively, the latter showing certain projections and recesses which act in the nature of a clutch;

Figs. 21 and 22 show a locking device on the main shaft, the first figure indicating the device locked, and the second showing the locking device free;

Fig. 23 is a detail showing the relation of the locking device and the connection with the coin insertion mechanism;

Fig. 24 represents a side elevation of extensions and attachments to the coin mechanism, and Fig. 25 shows a plan view of the end of an extension to the coin mechanism.

Numeral 1 indicates a casing, the upper front portion of which is provided with a glass panel 2 permitting a view of the suitably decorated display or indicating panel 3 on which predetermined heights or levels are marked at 4. Vertical apertures or slots 5 are provided at intervals in the panel 3 extending substantially from the top to the bottom of the panel, permitting certain decorated figures, designs, pointers or markers 6 to protrude from each aperture. Each vertical section denoted by such a pointer or marker 6 may be designated for convenience as "play column".

The problem confronting a player is to actuate the plungers 7 successively so as to position the markers 6 successively within their respective play columns at approximately the same heights or levels. It will be noted that we have provided three play columns and seven horizontal levels on the display or indicating panel 3.

The lower portion of the casing is extended horizontally toward the front, and mounted thereon are the vertically movable operating members or plungers 7. This lower front portion also contains the coin insertion mechanism 8 and a paper record outlet 9. At one side, namely, at the right side of the device, is provided the actuating lever 10 rotatably secured in the casing 1 at 11 and journalled therein in a suitable bearing, with a clutch provision having projections 73 and recesses 74, as is particularly shown in Figs. 19 and 20.

Figure 6:
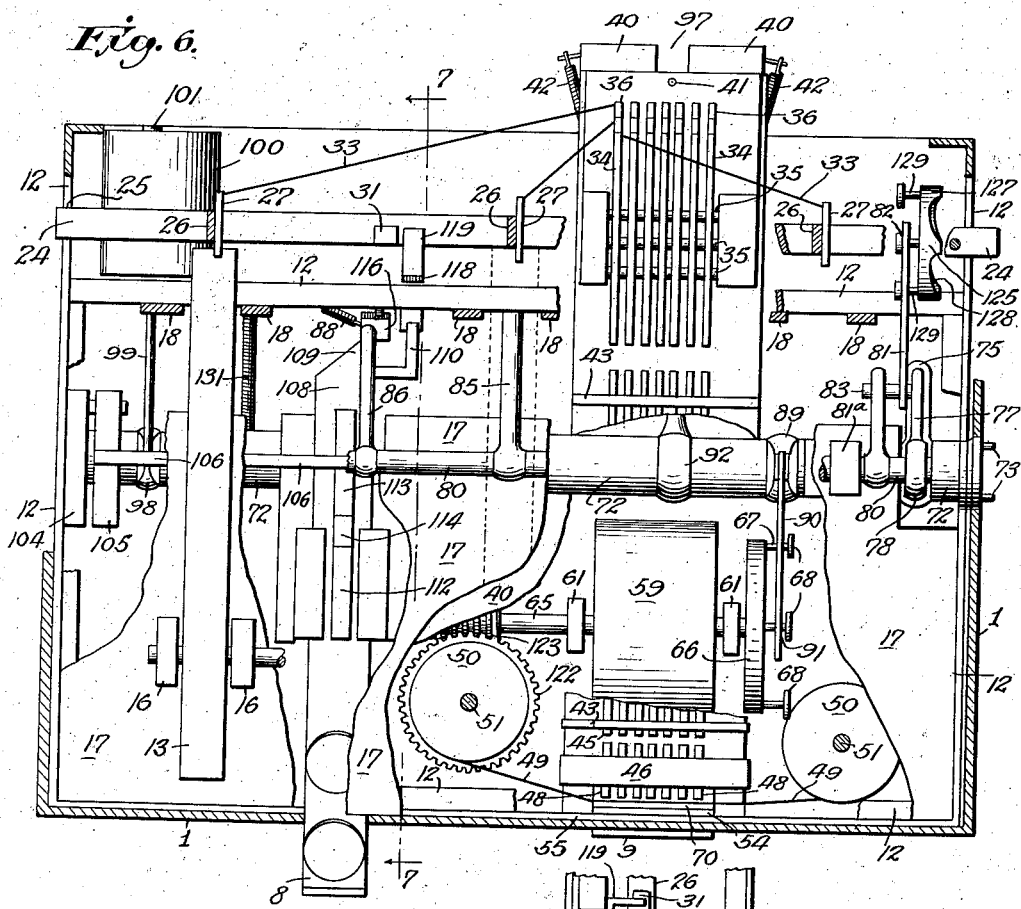
Fig. 6 illustrates a plan view of the device with portions of the mechanism cut away to show other portions beneath, looking down along line 6—6 of Figs. 4 and 5.
Figure 7:
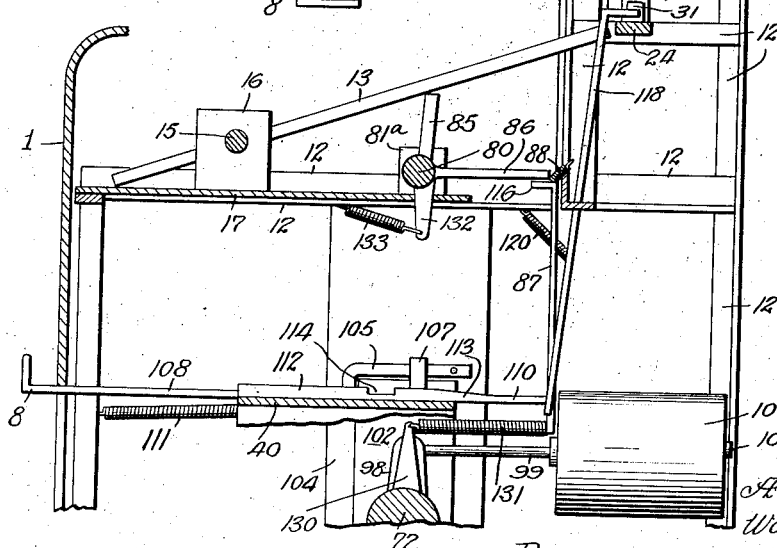
Fig. 7 is a sectional view showing certain details of the device along the line 7—7 in Figs. 4 and 6.

Reference numeral 12 indicates a frame carrying the mechanism which can be removed from the casing 1 when the rear wall of the casing is unlocked and removed. Provided within the casing and frame are a number of levers 13, one for each plunger 7, and each lever is pivotally journalled in a suitable bearing, as indicated in Figs. 5, 6 and 7 at 16. Each lever may be mounted on a shaft 15 which is fixed to members 16 attached to a base plate or mounting plate 17 secured on a cross portion of frame 12. The forward end of each lever 13 is positioned directly below its respective plunger 7, as particularly shown in Fig. 5. Each of these levers is positioned in alignment with its play column, each play column consisting of a pair of guides, such as 18, particularly shown in Fig. 4. A weight 19, preferably formed as shown in Figs. 8 to 11, inclusive, is slidably mounted within each pair of guides 18. Each weight may be channeled on each side or may be provided with projecting flanges 20 extending on each side and embracing the members 18 of the corresponding play channel so that each weight 19 can move freely within its play column. A pointer or marker, such as 6, may be secured to each weight (Fig. 5) and will project through the corresponding slot in the display panel (Fig. 1). The marker is thus visible through the glass panel and may be observed by the player. We have described and illustrated a specific weight structure for the purpose of convenience. It is understood, of course, that the weight as well as the other details disclosed herein may receive different structural forms.

Each weight 19 is equipped with a panel-like catch 21 pivotally mounted thereon and projecting downwardly from the rear thereof. A spring 23 may be provided for the purpose of biasing the catch away from the weight. Assuming that the weight shown in Figs. 8 to 11, inclusive, moves upwardly within one of the guide or play channels 18, as previously described, it will be clear that during this upward movement the catch, when encountering an obstruction, will resiliently respond without impeding the upward movement of the weight, but if the weight drops from its highest position and the catch 21 encounters an obstruction, it will engage the obstruction and the weight will thus be suspended in elevated position.

The mechanism for propelling or projecting any of the weights and associated markers in an upward direction within the corresponding guide or play channels consists, as previously noted, of the plungers 7 and associated pivotally mounted levers 13.

Figure 5:
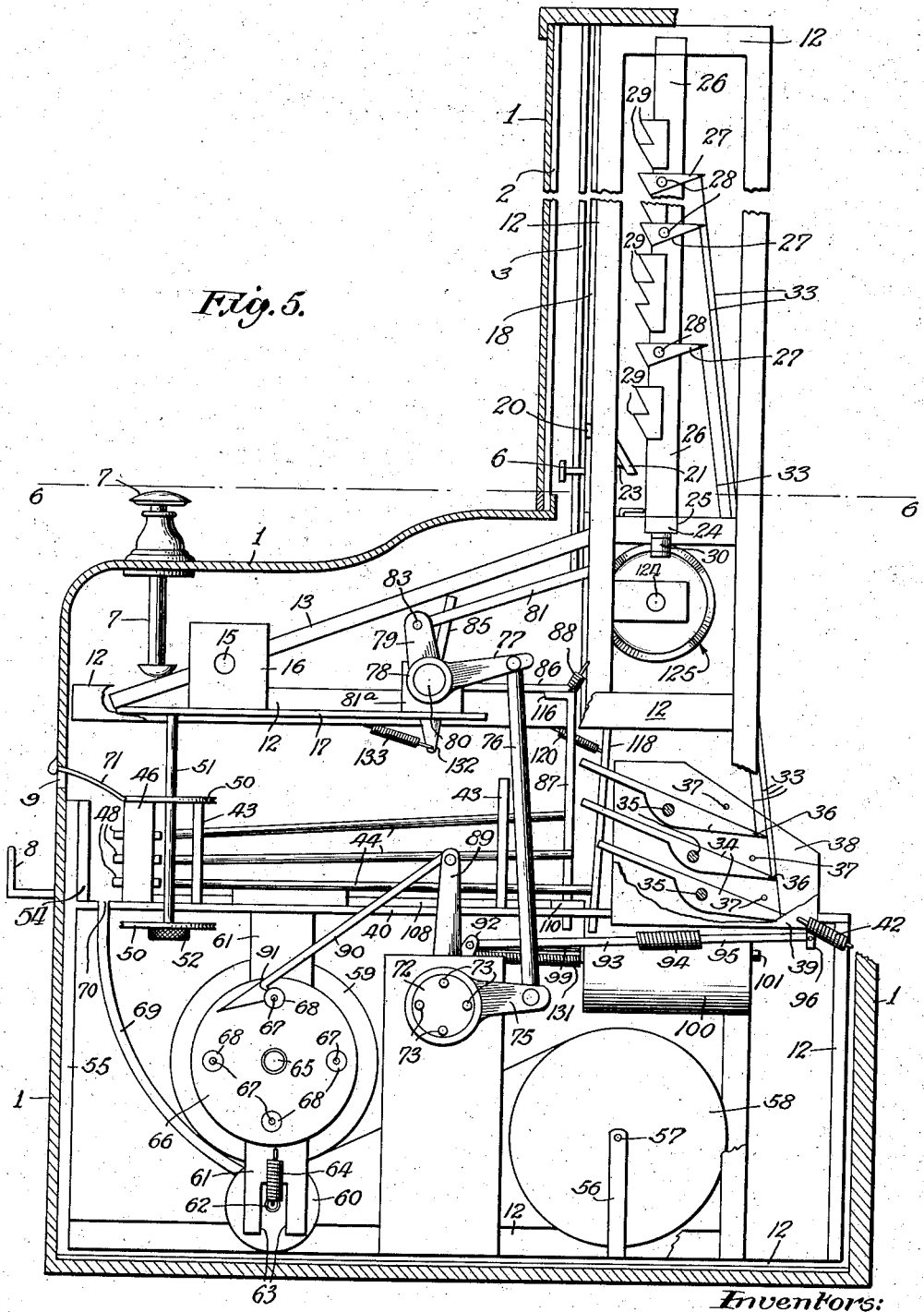
Fig. 5 represents a side view of the device with parts of the casing in section taken along line 5—5 of Fig. 4.

The mechanism for catching and suspending a weight in operated position is disposed in back of each play column, as is particularly shown in Figs. 4 and 5, and comprises a frame 24 which is laterally slidable in grooves 25 provided in bearings in the frame 12 and carrying vertical uprights 26. Each of these uprights 26 may be positioned immediately behind the respective play channels and weights 19. There are three uprights 26 in the illustrated embodiment. Referring particularly to Fig. 4, the upright 26 shown aligned with the first play channel 18 indicated in the left upper portion of the drawings, is equipped, at predetermined intervals, in this case at regular intervals, with a plurality of pivotally mounted rocking teeth 27, and each tooth is pivoted on a bearing 28, as shown in connection with the teeth 27 in Fig. 5. The other uprights 26, one mounted in back of the central play channel and the other mounted in back of the right-hand play channel in Fig. 4, are equipped with similar rocking teeth 27. The respective rocking teeth of all uprights 26 may be disposed horizontally in line or, in other words, on the same horizontal levels. At suitable intervals between the rocking teeth 27 on the uprights in the central and in the right-hand play section (Fig. 4) are stationary teeth 29 similarly projecting forward from the front face of the respective uprights 26, but not adapted for independent movement. Each of these uprights is thus not unlike a ratchet positioned in back of each weight for engagement with the catch pawl attached to each weight. The shape of these stops or teeth is such as to permit sliding engagement with the catch pawl 21 of the corresponding weights during the upward motion thereof, but when a weight drops the catch on its back will engage a stationary tooth or a rocking tooth at the level or height to which the weight was propelled and will suspend the weight in uppermost position.

The uprights 26 with their stationary and movable teeth are positioned during the play, as shown in Fig. 4, substantially centrally of and immediately behind the respective play columns. However, these uprights are laterally movable with respect to the play columns so as to drop suspended weights to the normal position at the conclusion of a play. The corresponding provisions are particularly shown in detail in Figs. 15 to 18, inclusive, and also appear from Figs. 4, 5 and 7. They include a roller 30 (Fig. 17) attached to a stud secured to the lower horizontal member of the frame 24 and positioned below the same on one side thereof—in this case, on the right side of the member 24 shown in Fig. 4. Located on the upper side of the member 24 is a catch 31 (see Figs. 4 and 7) shaped so as to slope downwardly to the right. A coil spring 32, shown in Fig. 4 at the upper left-hand side of the drawings, is attached at one end to the main frame 12 and at the other end to one of the uprights 26, holding the frame 24 in position with the uprights 26 positioned substantially centrally in front of the respective weights 19. In Figs. 15 to 18, inclusive, is also shown the mechanism for moving the frame 24 and uprights 26 laterally at the conclusion of the game. This mechanism consists of a cam 125, shown in Figs. 15 and 16, having on one side recesses and projections 126, 127, 128, and on the other side the projections 129. This cam is located as shown in Fig. 4 in the central right-hand portion of the device, and is adapted to engage the roller 30 secured to the frame member 24. The cam is actuated by a lever mechanism, as shown in Fig. 18, operable from the main shaft 72 to which is attached the crank 10 (Fig. 1). The details of operation will be presently described.

The main shaft 72 passes through the mechanism, as particularly shown in the lower part of Fig. 4, and is mounted in suitable bearings in the main frame 12. At one end of the shaft 72 are provided studs 73 and recesses 74 (Figs. 4, 5, 19 and 20) adapted for alignment with corresponding recesses and studs on the shaft of the actuating lever 10. The arrangement operates in the manner of a clutch and is provided in this particular form merely for the sake of convenience in assembly and operation.

As previously remarked, when a weight is propelled upwardly in one of the play columns to a point of suspension on one of the movable teeth 27, the engagement of the weight with such a tooth will initiate the positioning of the recording printing mechanism which we will now describe in detail.

As shown in the drawings, particularly Figs. 4 and 5, we have attached to each rocking tooth 27 a rod or wire 33 extending downwardly and secured at its lower end to a lever 34. These levers are pivotally journalled at points 35 in rows of seven levers each, there being one journal rod or bearing rod 35 provided for each row. One such row of seven recording levers is provided for each play column 26, because each play column in this embodiment is provided with seven levels. A rocking tooth, such as 27, may be positioned in the corresponding uprights 26 at each level and stationary teeth 29 may be disposed intermediate thereof. The journal rods 35 for the levers 34 are placed one below the other, as shown in Fig. 5, and each offset with respect to the other toward the rear of the apparatus. Stop pins 37 are provided for each row of levers so as to limit the movement of each lever when it is operated by its corresponding rocking tooth 27. The levers are normally disposed inclined, as shown in Fig. 5, having their tail ends 36 lower than their opposite operating ends. These levers are mounted in a frame 38, having downwardly extending flanges 39 which fit along each side of a horizontal base plate 40, as is particularly shown in Fig. 6. A hole 41 is provided at the rear of the base of frame 38. Coil springs 42 are attached at the rear ends to the frame 12 and at their forward ends to each side of the frame 38 to hold this frame and the levers 34 in normal position. The assembly of these levers may be termed a pre-selector because each lever, when actuated, pre-selects a distinctive type or figure to be subsequently printed on a record.

At the forward end of the apparatus, as is particularly shown in Figs. 4 and 5, are provided printer bars or type bars 48 movably secured in a frame 46, and interposed between these movable printer bars 48 and the actuating pre-selecting levers 34 are the intermediate longitudinal bars or rods 44 corresponding in number to the number of levers 34 or rocking teeth 27. In other words, there is one such intermediate bar for each pre-selecting lever 34 and one pre-selecting lever for each rocking tooth 27. The intermediate bars 44 are freely movable in holes provided in uprights 43, as shown in Figs. 5 and 6. The bars 44 are positioned so that their rear ends 44 will be in alignment with the forward ends of the corresponding pre-selecting levers 34 when the latter are in tilted or horizontal operating position. It will be seen that the rear ends of the bars 44 are disposed in staggered position so as to obtain proper engagement with the corresponding bars 34 for the purpose of printing the record. The forward ends 45 of the bars 44, as indicated in Fig. 6, are slightly spread so as to prevent the bars from falling back through the frame 43 when the machine is tilted.

A vertical upright 46 (Figs. 5 and 6) having three rows of slots 47 (Fig. 4) is secured to the mounting plate 40 (Fig. 5) and each slot is equipped with a rectangular type bar 48 carrying a distinctive number or design on its face corresponding with the respective number or design provided on the same level on the indicating panel 3, and therefore corresponding to the various rocking teeth 27 and indicative of the position thereof. These type bars project from the upright 46 and are positioned so that, when one of the intermediate bars 44 moves forward, it will force the corresponding type bar 48 forward against the platen 54 (Fig. 5.)

The entire recording mechanism so far described is provided for the purpose of furnishing a printed record to a player, indicating to him his score and specifically the placement of the weight pointers 6 in the various heights or levels in the play columns. Expressed structurally, the recording mechanism will indicate the positions of the recording teeth 27 on the respective uprights 26, which have been depressed by engagement of the respective weights 19. Assuming, for example, that one of the rocking teeth in each of the play columns is depressed by a weight 19, then there will be one pre-selecting lever 34 in each row tilted to horizontal operating position, its front end in alignment with the rear end of the corresponding intermediate bar 44. When the carriage or frame 38 holding the levers 34 is now moved forward (to the left, as seen in Fig. 5), then the three levers 34 which are now horizontally disposed will move three corresponding intermediate bars 44 to the left, and these three bars will actuate three corresponding type bars 48. It is apparent, therefore, that if a paper record were moved in front of the bars 48 within the channel 79 (assuming, of course, that the proper inking means are provided), then the markings of the three type bars 48 which are thus operated will be impressed on the paper record.

The provision of the inked ribbon 49 is particularly apparent from Fig. 6. The ribbon 49 is held at a tension in front of the forward faces of type bars 48 and is positioned on two vertical spools 50 (also shown in Figs. 4 and 5) provided on posts or pins 51 projecting downwardly from the frame 12 at each side and in rear of the type bar-carrying upright 46. One spool is held in position by a simple thumb screw 52 (Figs. 4 and 5) and the rotation of the spools is impeded by a suitable spring.

The mechanism for moving the ribbon consists, as shown in Fig. 4, of an extension 121 on the left spool post or pin 51 at the end of which is secured a horizontal cogwheel 122 which is in engagement with the worm gear 123 secured to an extension on the left end of the shaft 65 (Fig. 6) mounted within the bearing members 61, holding the friction roller 59 and the counter roller 60 (Fig. 5). The paper record ribbon is taken from a roll 58 journalled at points 57 within the frame 56, as shown in Fig. 5. The paper ribbon extends through the rollers 59 and 60 and through the channel 69 70 to the space between the platen 54 and the forward faces of the type bars 48. The platen 54 may be made of rubber and may be set in the upright plate 55 fixed on the frame 12, as shown in Figs. 5 and 6. The inked ribbon 49 extends, as previously indicated, in front of the type bars 48 within the space provided between the type bars and the platen 54. The detail of the assembly of the rollers and the operating mechanism for the paper transport is apparent from Figs. 12 to 14. The complete assembly is best seen from Figs. 4, 5 and 6.

The roller 59 may be covered with friction material in order to facilitate the transport of the paper record. The bearing 62 of the lower or counter roller 60 passes at each side through slots 63 provided at the end of the respective frame member 61, as indicated in Fig. 5. The lower roller 60 is held close to the upper roller 59 by the tension of springs 64 secured at their lower ends to the shaft of roller 60 and at their upper ends to the uprights 61. Positioned on the shaft 65 of roller 59 is a plate 66 having studs 67 projecting outwardly and set equally distant from each other peripherally of the plate 66, each stud bearing a flange 68, as particularly shown in Fig. 12, and also apparent from Figs. 4, 5 and 6.

Suitably positioned on the main shaft 72 with relation to the plate 66 and its studs 67 is a crank arm 89 pivoted to an arm 90 having a curved catch 91 adapted to engage with the studs 67 on the plate 66 (Figs. 13, 14). When the main shaft 72 is rotated so as to tilt the crank 89 into the dotted position in Fig. 13, moving the arm 90 into its dotted position, this arm will engage a stud, such as 67, preparatory to rotating the shaft 65, and with it the friction roller 59, so as to transport a portion of the paper record through the channel 69. This operation will be taken up again later, incident to describing a whole cycle of operation of the mechanism. It will be apparent, however, that when the main shaft 72 is thus rotated by means of the operating handle 10, actuated by the player at the conclusion of a game, then upon rotating the shaft 72 back to normal, the friction roller 59 will be moved and will move the record paper, as intimated. The printing of the score is accomplished incident to the forward movement of lever 10, and the movement of the paper will cause the ejection of the printed record.

The curved paper channel 69 leads forward and upwardly and terminates in the slot 70 in the frame member 40 below the space between the inked ribbon 49 and the rubber platen 54, as shown in Fig. 5. The paper outlet is indicated at 71 and terminates in the opening 9 in the casing 1. The guide 71 may be curved to fit the upper end of the upright 46 and to contact properly with the upper portion of the paper outlet 9. The lower edge of the paper outlet may be serrated so as to tear off the record properly. The upper edge of the paper outlet may project slightly forward, as indicated in Fig. 5.

Referring now particularly to the mechanism for moving the pre-selector frame 38 holding the levers 34, discussed in connection with the recording mechanism, we have shown in Fig. 5 attached to the main shaft 72 an arm 92 pivotally connected to a horizontal arm 93 which is connected by means of a coiled spring 94 with the extension arm 95, and the latter is again pivoted to a stud 96 which projects below the frame 38 through a longitudinal slot 97 in the plate 40. Simultaneously with rotating the main shaft by means of the actuating lever 10, the lever 92 will pull the arms 93 and 95 forward to the left, as seen in Fig. 5, and will thus move the carriage or frame 38, holding the pre-selecting levers 34, to the left against the intermediate levers 44. And, inasmuch as some of the levers 34 are actuated at this moment or may be actuated due to one or the other weight in the corresponding play channel, having engaged one of the rocking arms 27, the printing of the record will properly take place on the paper tape positioned in front of the type bars 48. On the return movement of lever 10 and shaft 72, the paper will be transported as described, and the printed record or score will be furnished at the outlet 9.

We will now describe the mechanism for actuating the frame 24 carrying the uprights 26 and the stops or teeth for suspending the weights within the respective play columns.

As is particularly shown in detail in Figs. 19 and 20, and as is also apparent from Figs. 4 and 5, we have provided on the main shaft 72 an arm 75 pivotally connected with a link 76. This link in turn is pivoted at its upper end with an arm 77 which is secured on a sleeve 78 bearing the arm 79. The sleeve 78 fits around the horizontal auxiliary shaft 80 extending to within a short distance of each side of the frame 12 and mounted at each end in the bearings 81a carried on the frame member 17, as shown in Fig. 4. The arm 79 carries at its upper end a fixed arm 83 (Fig. 5) and in a bearing thereon and extending backward from it is the arm 81 which is shaped to form at its rear end a catch 82 for engagement with the studs 129 of the cam 125 which in turn is adapted to actuate the frame 24 by means of the roller 30, which is attached to it as shown in Fig. 17. The cam 125, shown in Figs. 15–16 is provided with a flange 126 extending toward the roller 30, and is secured to a carrier 24 shown in Fig. 5. The cam carries the elevations 127 and the depressions 128, as shown, and is placed so that on rotation the roller 30 carried by the frame 24 (Figs. 4 and 17) rides along the depressions 128 and elevations 127. The four studs 129 projecting from the other side of the cam are set equally distant from each other near the periphery of the cam 125, and the catch 82 on the extension arm 81 (Fig. 18) normally rests on one of the studs 129.

Assuming again that the main shaft 72 is actuated by means of the operating lever 10, then the arm 75 (Figs. 5 and 18) will be tilted, moving the lever 76 and with it the arm 79 to which is pivoted the extension 81 with its catch 82 engaging one of the studs 129 on the cam member 125. During the return movement of the shaft 72 the motion of the various levers and arms will be in a reverse direction and, accordingly, since the catch 82 on the arm 81 engages a stud 129 of the cam 125, the cam will be rotated and will cause the roller 30 to ride along its depressions and elevations. Inasmuch as this roller is attached to the frame 24, the frame will respond and will move laterally, carrying with it the uprights 26 on which are mounted the various stop teeth for suspending the weights in the respective play columns. Also assuming that in each play column a weight was projected upwardly and is suspended on one of the stop teeth, then, responsive to the movement of the frame 24 and corresponding movement of the uprights 26, the suspension of the weights will cease and the weights will fall to their normal position. The coaction of these elements will be more apparent from a detailed discussion of the operation of the mechanism through an entire playing cycle, which will be presently furnished.

We will next describe the locking mechanism for the levers 13 which are actuated by the plunger 7 when a player desires to project the weights upwardly within the respective play channels or columns.

On the auxiliary shaft 80 is secured an arm 84 (Fig. 4, center right-hand section, and shown in detail in Fig. 19) placed so that when the arm 83 moves upwardly the fixed arm 84 will be raised. Also positioned on the shaft 80 are three horizontal fixed arms 85 (Figs. 4, 5 and 7) each placed centrally immediately below each respective lever 13, and near the rear end of the same. A horizontal release bar 86 is suitably positioned and fixed on the shaft, as shown in Fig. 5, being curved at its rear end. Immediately below is disposed the angular top portion 116 of the vertical bar 87 which is pivoted on the frame 12 for side movement. The spring 88 is secured to the side of the top of bar 87 and to one side on the frame 12, tending to hold the bar 87 vertical. It will be seen, particularly from Fig. 7, that so long as the arms 85 are each placed beneath the corresponding actuating bars or levers 13, these levers will be held in locked position, the arm 85 being held against the tension of spring 133. However, when the release of the bars is to be accomplished, as will be described presently, the tension of spring 133 will act to tilt the arms 85 on shaft 80 to release the actuating bars for operation.

Both shafts 72 and the auxiliary shaft 80 have return springs against the tension of which their motions are accomplished. The shaft 72, as shown in Figs. 4 and 7, is provided with an arm 130, the end of which is secured to a spring 131 which may be attached to the frame 12. Any rotating motion of the shaft 72 will therefore be accomplished against the tension of spring 131. The auxiliary shaft 80 is provided with a fixed arm 132, the end of which engages the spring 133 which in turn is attached to the frame 12.

In order to prevent jarring of the mechanism incident to returning the main shaft 72 to normal, we have provided a dash pot 100 (Fig. 4, lower left-hand corner, and also shown in detail in Fig. 7). The plunger or piston rod 99 of this dash pot is secured to one end of an arm 98 attached to the shaft 72. An adjustable air valve 101 (Fig. 7) is provided at the other end of the dash pot 100, in accordance with usual practice.

The frame 24 carrying the toothed uprights 26 is normally locked by a mechanism comprising an upright arm 118 pivoted to move backward or forward on the frame 12, as shown in Fig. 4 and also in Fig. 7, carrying a hook catch 119 extending to the rear and in position to engage with the catch or stop member 31 on the frame 24 when the uprights 26 are withdrawn from behind the catches 21 on the weights 19, which happens when the arm 118 is in vertical position. A spring 120 is fixed at its rear end to the arm 118 below the pivot point, and the other end of the spring is attached to the frame 12. The arm 118 is thus normally held in the position shown in Fig. 7 with the catch 119 in the path of the stop 31 on the frame 24. Lateral movement of the frame 24 carrying the ratchet columns or stop teeth is thus normally prevented. However, when the arm 118 is tilted against the tension of the spring 120, the frame 24 will be free for lateral motion, and release of the weights can be accomplished.

The locking mechanism for the shaft 72 and for the coin insertion mechanism 8 comprises, as particularly shown in Figs. 21 to 23, a fixed block 102 on the shaft 72 near the left end main bearing 104 shown at the lower left-hand corner of the drawing Fig. 4 with arm 103 secured to the rear of the block 102. Positioned above the block 102 and pivoted at one end on the main bearing 104 is the hook catch 105. Extending to the right and fixed at its left end to the upper portion of hook catch 105 is a bar 106 which carries a square downward extension 107. This structure is intimately tied up with the coin insertion mechanism 8 which may be of a generally suitable type, extending inwardly horizontally from the casing 1 and carrying at its base an extension plate 108, all shown in Figs. 6 and 7. The extension plate is cut at an angle at its rear end 109 (Fig. 25) and placed so that on inward movement its angular end engages with the lower end of the release bar 86. An angle arm 110 projects from one side of the plate 108. The spring 111 is attached at its rear end to the base of plate 108, and at its forward end to the frame 12. Centrally situated on the extension plate 108 is a shaped bar 112 tapering downwardly at its rear end 113 and containing a square slot 114 shaped to receive the lower portion of the downward projection 107.

The cycle of operation includes the following general actions and results:

Assuming that the mechanism is in condition for operation, a coin is inserted and the coin plate is pushed into the apparatus. This action releases the operating bars 13 to the playing position, and the plungers 7 are forced up. The frame 24, carrying the uprights 26 with their teeth 27 and 29, is moved so as to position the teeth in back of the respective play columns. The main shaft is unlocked at the same time, and the coin mechanism is locked against operation.

The plungers 7 are now struck in succession, as previously intimated and, accordingly, the weights are projected upwardly and are suspended on the movable or on the stationary stops of the ratchet bars 26, respectively. The weights projected into engagement with movable stops 27 cause the positioning of the pre-selector levers 34. The player can observe the position of the weights directly due to the markers placed with relation to the display panel 3.

The lever 10 is then pulled forward. This causes the proper positioning of the mechanism for subsequently moving the frame 24 and the ratchet bars 26; the levers 13 are raised and locked, and the plungers 7 drop to their fullest extent; the coin mechanism is unlocked and positioned to normal for receiving another coin; the paper transport mechanism is set for operation; the score of the player is printed on the paper record; and the dash pot 100 is properly positioned for cushioning the return movement of the main shaft 72.

The lever 10 is then released and returns to its normal position, causing again a number of operations; namely, the cam 125 is rotated to move the frame 24 and with it the uprights 26 so as to drop the weights onto the ends of the locked levers 13; the pre-selector bars 34 are restored to normal due to the removal of the weights from the actuated rocking levers 27; the frame 24 is locked in position with the ratchet bars withdrawn from the play columns; the paper transport is actuated and the printed record of the score is ejected through the opening 9; the inked ribbon 49 is wound up; the pre-selector 38 with its bars 34 is restored to normal; and the main shaft 72 is locked.

The details incident to the above intimated operations are pointed out below.

When a coin or a token or the like is inserted, the coin insertion mechanism 8 can be pushed to the rear, and this action carries with it the extension plate 108, the angle arm 110 and the shaped bar 12. The shaped end 109 of the plate 108 engages with the right side the lower portion of upright bar 87, pushing it to the left along the inclined face of the plate 109. The angular upper portion 116 of the bar 87 is moved to the right away from the end of the release bar 86, and the spring 133, acting on the arm 132, draws back the release bar 86, and the upright arms 85 partially rotating the auxiliary shaft 80. The arms 85 move forward and the ends of the levers 13 drop to the playing position, the weights 19 dropping with them, and the plungers 7 are forced up. Incident to partial rotation of the auxiliary shaft 80, the arm 84 moves downwardly. When the angle arm 10 moves backward, it presses against the lower end of the upright arm 118 (Fig. 7), carrying it backward, and the hook catch 119 on its end moves forward and frees the catch 31 on the frame 24. The spring 32 (Fig. 4, upper left), acting on the frame 24 which supports the toothcarrying uprights 26, exerts its tension and draws the frame 24 to the left, bringing the uprights 26 with their teeth 27 and 29 into position behind the catches 21 attached to the respective weights 19.

Thus, incident to the insertion of a coin and movement of the coin mechanism, the actuating bar and plungers 7 are freed, the weights are dropped to lowermost position, and the ratchet bars are moved into position centrally of the play columns.

When the shaped bar 112 moves backward, it forces up the square downward projection 107 which is normally resting on the end 113 until it drops into the square slot 114, locking the coin mechanism 8 in position. At the same time the bar 106 is raised, raising with it the hook catch from the block 102, leaving it free to move and leaving the main shaft free for rotation.

The mechanism is now fully unlocked and ready for playing.

The player will strike the plungers 7 which protrude from the casing, and the force will be transmitted in each instance through the corresponding plunger 7 and associated lever 13 to the corresponding weight which is driven upwardly a distance depending on the force of the blow. On the upward motion the catch 21 of the weight passes over the teeth 27 and 29 of the corresponding upright, since it can freely move due to the spring arrangement 23 holding the pivoted catch 21 in the position shown in Fig. 9. The left plunger will be normally struck first, and the weight 19 will drop after the propelling impulse is exhausted and will engage a rocking tooth 27 positioned immediately below the maximum height attained by the weight. There are no stationary teeth 29 provided in the left play column in the present embodiment of the device. In case the weight 19 drops to a rocking tooth 27, the catch 21 of the weight will engage its forward end. The weight thus tilts the rocking tooth and raises its rear end and with it the attached recording rod 33, and this rod in turn raises the tail end 36 of its respective preselecting recording lever 34 so as to be in alignment with the rear end of the corresponding longitudinal intermediate bar 44. The weight remains suspended.

The next plunger is then struck, and the force is similarly transmitted to propel the weight in the second play column upwardly. The upright 26 behind this column is provided with both fixed teeth 29 and rocking teeth 27. When the force of the blow is exhausted, the weight 19 will start to drop, and its catch 21 engages the tooth immediately below the maximum height attained by the weight. This tooth may be a fixed tooth 29 or it may be a rocking tooth 27. If the tooth is a fixed tooth 29, nothing further will happen except that the weight, of course, remains suspended in elevated position. If, however, the tooth is a recording or rocking tooth 27, the catch 21 of the corresponding weight will press on the forward end of this tooth and will similarly raise the rear end and with it the corresponding recording rod 33 and the tail end 36 of the corresponding pre-selecting recording lever 34, aligning the forward end of this lever 34 with the rear end of the corresponding longitudinal intermediate bar 44.

Other plungers 7 are operated similarly, and the weights coacting with these plungers are driven upwardly in a like manner, the catches on these weights operating alike. These weights thus come to rest either upon stationary teeth or, as the case may be, upon movable recording teeth 27, respectively, and corresponding recording pre-selecting levers are thus aligned for subsequent operation with intermediate recording bars 44.

The object of the play is to drive a plurality of weights to the same recording heights. A proper degree of force should be employed upon striking the second and the subsequent plungers 7 to drive the second and subsequent weights 19 to the same height at which the first weight 19 came to rest. In each case the pointer 6 secured to the corresponding weight 19 will visually indicate on the panel 3 the height on which the weight is suspended. Upon completion of the play all the plungers will have been struck, and the respective weights will have been driven upwardly and are suspended in elevated position.

The actuating lever 10 is now pulled forward against the force of spring 131, partially rotating the main shaft 72, drawing the fixed arm 75 upwardly, raising the connecting link 76, which raises the arm 77 and partially rotates the sleeve 78, lowering the arm 79 and drawing forward the shaped arm 81 and with it the catch 82. This catch now slides over the upper stud 129 and drops to the next lower forward stud 129 on the cam 125, as shown in detail in Fig. 18. The mechanism is now in a position to move the frame 24 and the ratchet uprights 26 on the return movement of the lever 10.

At the same time arm 83 is pushed upwardly and the extension of arm 83 pushing against the fixed bar 84 moves it upwardly, partially rotating the auxiliary shaft 80 and raising the fixed arms 85 from horizontal to partially upright positions, pushing up the rear ends of respective levers 13. The forward ends of the levers 13 move downwardly, permitting the plungers 7 to drop to their fullest extent. At the same time, upon partial rotation of the shaft 80, the release bar 86 is raised. Its curved right-hand side pushes the angular stop 116 of the bar 87 to the right. The spring 88 asserts itself against the crank arm 89 and the bar 87 returns to vertical position. The release bar 86 rests on the angular top 116, and the locking arms 85 and their respective levers 13 are locked in the position shown in Fig. 5. As will be seen later, the extension plate 108 is drawn forward with its rear end 109 away from bar 107 incident to this actuation of the lever 10.

During this rotation of the lever 10 forward and consequent partial rotation of the main shaft 72, the crank arm 89 is drawn forward and moves arm 90 forward, sliding the curved end 91 over its engaged stud 67 on plate 66, positioning the mechanism to move the recording paper 58 properly incident to the return movement of lever 10.

The same movement of lever 10 and partial rotation of shaft 72 draws forward the upright arm 92 which pulls the link consisting of arm 93, spring 95 and arm 94, drawing forward the frame 38 and the pre-selected recording levers 34. Some of these levers are positioned, as will be remembered, in alignment with the intermediate recording rods or bars 44. Those longitudinal intermediate bars 44 which are in contact and alignment with actuating levers 34 are carried forward by the same movement against the rear ends of the type bars 48, and the intermediate bars 44, which are thus actuated, carry forward corresponding type bars 48 and press the faces of these type bars against the paper contained in the space between these faces and the rubber platen 54. Inasmuch as an inked ribbon is positioned in the type spacing, it is clear that the record of the score will now be printed on the paper tape. The spring 94 is disposed in the link of the arms 93—95 in order to take up the pull on the recording mechanism and to obtain a resilient actuation which is more preferable than a rigid actuation of the printer bars.

During this same forward movement of the lever 10 and partial rotation of the main shaft 72 the dash pot arm 98 is drawn forward, pulling the piston rod or plunger 99 and corresponding piston inside of the dash pot 100 to position the dash pot to check the speed of the return movement of the main shaft 72 and the actuating lever 10.

The block 102 secured to the main shaft 72 is moved upwardly during this motion of the main shaft, and the arm 103 moving with it raises the hook catch 105. The latter raises the bar 106 and the projections 107 from the square slot 114. This permits the spring 111 acting on the extension plate 108 to draw it forward and to position the coin mechanism 8 in normal position.

The angle arm 110 comes forward with the plate 108 and permits the hook catch 119 on the upright arm 118, assisted by the spring 117, to move back over the lower horizontal member or frame 24 in readiness to engage with the catch 31 on the frame 24 when it is withdrawn to the right.

When the extension plate 108 comes forward, the end 109 is withdrawn from the side of the lower end of upright bar 87, permitting the spring 88 to assert itself to position the bar 87 upright, and its angular top 116 is brought to normal below the end of the release bar 86. This, as noted previously, holds the release bar 86 in horizontal position, and locks the levers 13 with their rear ends up, also locking the shaft 80 and all the attachments secured thereto.

The lever 10 is now released, and the return spring 131, acting on the fixed arm 130, draws the main shaft 72 back into its normal position, also positioning the lever 10 back to normal, the return movement of the main shaft 72 being checked by the dash pot 100 and its piston rod 99 connected to the arm 98 attached to the main shaft 72.

When the main shaft 72 is returned, as above indicated, its fixed arm 75 will move backward, lowering the connecting link 76, drawing down the arm 77, rotating the collar or bushing 78, and forcing backward the fixed arm 79 which in turn forces back the arm 81 and with it the catch 82. The latter drives back the engaged stud 129 and thus partially rotates the cam 125, its flanges 126 moving against the roller 30 secured on a stud on the frame 24 and causing the roller 30 and its associated stud to ride from a depression in the flange 126 of the cam 125 to an elevation, thus moving the frame 24 to the right and displacing laterally the uprights 26 carrying the rocking or stop teeth 27 and 29, respectively. This operation disengages the rocking teeth from catches on the weights suspended until this moment and permits the weights to fall freely until they come to rest on the ends of the locked levers 13. The pointers secured to the weights may be viewed through the lower portion of the glass enclosure of the casing. When the teeth 27 are withdrawn from the weights 19, the relative ends of the recording teeth 27 assume their normal positions and, inasmuch as these teeth are connected by means of the rods 33 with the recording levers 34, the levers 34 resume their normal position, as shown in Fig. 5.

When the frame 24, and with it the uprights 26, moves to the right, the shaped catch 31 moves with it below the hook catch 119 secured in the upper end of the locking bar 118, the hook catch riding over the inclined top of the catch 31 until the left side of the catch 31 engages with the right side of hook catch 119, locking the frame 24 in withdrawn or displaced position with regard to the play channels or play columns. The movement of the arm 81 and its catch 82 continues after the locking of the frame 24 is accomplished until a depression on the flange 126 of the cam 125 is opposite the roller 30 on the stud attached to the frame 24 so as to permit the frame to move to the left when the hook catch 119 is moved clear of the catch 31.

During the return rotation of the main shaft 72 the upright arm 89 will move backward, drawing back the arm 90 whereupon the catch 91 engaged with stud 67 rotates the plate 66 and with it the friction paper roller 59 which in turn rotates the roller 60 moving the paper upwardly and forwardly through the channel 69 and the printed record portion of the paper tape is ejected through the paper outlet 9 where it may be detached by tearing it against the serrated lower edge of the opening. This rotation of the friction roller 59 turns the worm gear 123 which rotates the cogwheel 122 and with it the extension pin 121 and the ratchet post 51 (Fig. 4) of the inked ribbon, slightly winding up this ribbon 49 so as to prepare for another printing operation.

The upright arm 92 on the main shaft 72 is also moved backward incident to the return movement of the main shaft, and with it move the horizontal arms 93 and 95, relieving the tension on spring 94 and permitting springs 42 to assert themselves. These springs then draw back the frame 38 and pre-selecting recording levers 34 to normal position.

The type bars 48 are carried back to normal position by the tension of the inked ribbon 49 against their surfaces. The printing mechanism is thus returned to normal.

The block 102 on the main shaft 72, and with it the rod 103, also moves backward incident to the return movement of the main shaft 72. When the block reaches a vertical position the hook arm 105 is free to drop over the top of the block 102, locking the mechanism in this position. This action lowers the bar 106 and projection 107 to a position where the shaped end is in readiness to engage in the square slot 114 when the coin mechanism 8 is again moved inwardly.

The device is now in a position for re-playing, and may be released as previously described, by the insertion of a coin or token or the like. The cycle of operation can then be repeated.

The terms "forward" or "front" are used herein with reference to the parts of the machine nearest the player; and the terms "backward" or "rear" are used with reference to the parts of the machine farthest from the player.

What we desire to have protected by Letters Patent of the United States is particularly defined and pointed out in the appended claims. It is understood that changes and modifications are possible in details, as well as in the entirety of the assembly, and we therefore desire to state distinctly that we consider as our invention any embodiment or modification meeting the spirit and scope of the claims which follow.

We claim as our invention:

1. An amusement device comprising, a plurality of vertically disposed channels, a weight movably disposed in each of said channels, operating means for moving said weights within said channels, a locking bar disposed in back of each of said channels, and teeth disposed on each bar in spaced relation to each other and being individually movable with respect to the corresponding bar for catching and holding said weights suspended within said channels.

2. The structure defined in claim 1, together with means movable with said weights for indicating the position of each weight within its channel.

3. The structure defined in claim 1, together with means movable with said weights for indicating the position of each weight within its channel, and separate recording means operated by the movable teeth holding said weights suspended for recording the position of said weights in channels.

4. The structure defined in claim 1, wherein said locking bars are laterally movable, together with means movable with said weights for indicating the position of each weight within its channel, and separate recording means operated by the movable teeth holding said weights suspended for recording the position of said weights in said channels, and together with means for laterally moving said locking bars to release said weights.

5. The structure defined in claim 1, wherein stationary teeth are provided on at least one of said locking bars in addition to the teeth thereon which are movable thereto, said stationary teeth being in spaced relation to each other and to said movable teeth whereby the corresponding weight may engage either a stationary tooth or a movable tooth on said locking bar and be suspended thereby upon termination of its motion within the corresponding channel, together with means controlled by said movable teeth on said bars upon engagement of said weights therewith for recording the positions of said weights within said channels.

6. In an amusement device of the class described, a plurality of vertically disposed channels, a weight for each channel and freely movable therein, means for imparting motion to each weight to project the same upwardly within its corresponding channel, a plurality of movable means disposed in back of each channel at predetermined levels thereof, each for catching and suspending the corresponding weight projected upwardly therein at the conclusion of its upward motion, means carried by each weight for visually indicating the position thereof within its channel, and means controlled by said movable means for separately recording the position of said weights projected upwardly in said channels when said weights engage therewith and are suspended thereby.

7. The structure defined in claim 6, together with a frame for securing said movable means in back of said channels and means for moving said frame to displace said means relative to said weights whereby suspended weights are dropped to normal position.

8. The structure defined in claim 6, wherein stationary weight-suspending means are provided intermediate of said movable suspending means, together with a movable frame for securing all of said suspending means, and means for causing said frame to drop said weights suspended by said means to normal and to lock said motion-imparting means against operation.

9. In an amusement device of the class described, comprising weights a vertically disposed guide channel for each weight, means for projecting each weight upwardly within its guide channel by impact force applied thereto, a frame in back of said channels, bars carried by said frame and individually disposed in back of said channels, stop teeth carried by said bars, means on said weights for engaging said stop teeth whereby said weights are supported on said teeth upon cessation of the upward motion thereof, and means for laterally moving said frame and said bars with said stop teeth thereon whereby weights suspended upon said teeth are released.

10. The structure defined in claim 9, wherein said stop teeth are individually movable with respect to the corresponding bars, together with recording means governed by said movable teeth upon engagement of said weights therewith for recording the position of said weights suspended on said movable teeth.

11. The structure defined in claim 9, wherein said stop teeth are individually movable with respect to the corresponding bars, together with recording means governed by said movable teeth upon engagement of said weights therewith for recording the position of said weights suspended on said movable teeth, and means for releasing said recording means and for simultaneously locking said structure against operation.

12. An amusement device comprising a plurality of vertically disposed guide channels, a weight freely movable in each guide channel, an indicating panel covering said channels, slots in said panel in alignment with said channels, an indicating member secured to each weight and projecting through the corresponding slot to the face of said panel for indicating the vertical position of each of said weights, externally projecting plunger means and cooperating internally disposed lever means for imparting upward motion to each of said weights within each channel, a rack disposed in back of each channel and carrying teeth, catch means on each weight for resiliently engaging said teeth incident to the upward motion of said weight and for rigidly engaging said teeth during downward motion thereof, whereby each weight may be projected upwardly within its channel in proportion to the force applied to said plunger means thereof and suspended in engagement with one of said teeth near the uppermost level attained during its upward motion, a recording device including a type printer, and means governed by some of said teeth for determining the actuation of said recording device to furnish a printed record of the positioning of said weights.

13. An amusement device comprising a plurality of vertically disposed guide channels, a weight freely movable in each guide channel, an indicating panel covering said channels, slots in said panel in alignment with said channels, an indicating member secured to each weight and projecting through the corresponding slot to the face of said panel for indicating the vertical position of each of said weights, externally projecting plunger means and cooperating internally disposed lever means for imparting upward motion to each of said weights within each channel, a rack disposed in back of each channel and carrying teeth, catch means on each weight for resiliently engaging said teeth incident to the upward motion of said weight and for rigidly engaging said teeth during downward motion thereof, whereby each weight may be projected upwardly within its channel in proportion to the force applied to said plunger means thereof and suspended in engagement with one of said teeth near the uppermost level attained during its upward motion, a recording device including a type printer, and means governed by some of said teeth for determining the actuation of said recording device to furnish a printed record of the positioning of said weights, together with operating means for actuating said recording device.

14. An amusement device comprising a plurality of vertical disposed guide channels, a weight freely movable in each guide channel, an indicating panel covering said channels, slots in said panel in alignment with said channels, an indicating member secured to each weight and projecting through the corresponding slot to the face of said panel for indicating the vertical position of each of said weights, externally projecting plunger means and cooperating internally disposed lever means for imparting upward motion to each of said weights within each channel, a rack disposed in back of each channel and carrying teeth, catch means on each weight for resiliently engaging said teeth incident to the upward motion of said weight and for rigidly engaging said teeth during downward motion thereof, whereby each weight may be projected upwardly within its channel in proportion to the force applied to said plunger means thereof and suspended in engagement with one of said teeth near the uppermost level attained during its upward motion, a recording device including a type printer, means governed by some of said teeth for determining the actuation of said recording device to furnish a printed record of the positioning of said weights, together with operating means for actuating said recording device, and means for simultaneously automatically releasing said weight and for locking said internally disposed lever means against operation.

15. An amusement device comprising a plurality of vertically disposed guide channels, a weight freely movable in each guide channel, an indicating panel covering said channels, slots in said panel in alignment with said channels, an indicating member secured to each weight and projecting through the corresponding slot to the face of said panel for indicating the vertical position of each of said weights, externally projecting plunger means and cooperating internally disposed lever means for imparting upward motion to each of said weights within each channel, a rack disposed in back of each channel and carrying teeth, catch means on each weight for resiliently engaging said teeth incident to the upward motion of said weight and for rigidly engaging said teeth during downward motion thereof, whereby each weight may be projected upwardly within its channel in proportion to the force applied to said plunger means thereof and suspended in engagement with one of said teeth near the uppermost level attained during its upward motion, a recording device including a type printer, means governed by some of said teeth for determining the actuation of said recording device to furnish a printed record of the positioning of said weights, together with operating means for actuating said recording device, and actuating means for simultaneously automatically releasing said weights and for locking said internally disposed lever means against operation, a movable frame for said racks, said frame being moved responsive to the operation of said actuating means to release said weights.

16. An amusement device comprising a first bar and a plurality of teeth movably mounted thereon, a second bar disposed parallel to and alongside said first bar and carrying a plurality of fixed teeth, said movable teeth on said first bar and said fixed teeth on said second bar forming a unitary ratchet, a weight movably disposed in front of said ratchet, means for moving said weight, and a pawl on said weight for engagement with said ratchet teeth whereby said weight may be retained in engagement with any one of said teeth thereon.

17. The structure defined in claim 16, together with a carrier for said ratchet, and means for displacing said carrier together with said ratchet to release the weight engaging a tooth thereon.

18. The structure defined in claim 16, together with a carrier for said ratchet, means for displacing said carrier together with said ratchet to release the weight engaging a tooth thereon, and means on said carrier for holding said weight while said carrier is in displaced position.

ARTHUR BULMER SMEAL.
WALTER KINGSLEY JULL.